United States Patent
Marshall et al.

(10) Patent No.: US 6,900,819 B2
(45) Date of Patent: May 31, 2005

(54) SYSTEMS AND METHODS FOR AUTOMATIC EMPHASIS OF FREEFORM ANNOTATIONS

(75) Inventors: Catherine C. Marshall, San Francisco, CA (US); Frank M. Shipman, III, College Station, TX (US); Gene Golovchinsky, Palo Alto, CA (US); William N. Schilit, Menlo Park, CA (US); Kei Tanaka, Hiratsuka (JP); Morgan N. Price, Lafayette, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 252 days.

(21) Appl. No.: 10/244,069

(22) Filed: Sep. 16, 2002

(65) Prior Publication Data

US 2003/0070139 A1 Apr. 10, 2003

Related U.S. Application Data

(60) Provisional application No. 60/318,826, filed on Sep. 14, 2001.

(51) Int. Cl.[7] ............................................. G09G 5/00
(52) U.S. Cl. ..................... 345/667; 345/670; 345/676; 345/682; 345/689
(58) Field of Search .......................... 345/667, 670, 345/676, 682, 689

(56) References Cited

U.S. PATENT DOCUMENTS

| | | |
|---|---|---|
| 5,687,254 A | 11/1997 | Poon et al. |
| 5,692,073 A | 11/1997 | Cass |
| 5,970,455 A | 10/1999 | Wilcox et al. |
| 6,279,014 B1 | 8/2001 | Schilit et al. |
| 2002/0116420 A1 * | 8/2002 | Allam et al. ................. 707/526 |

OTHER PUBLICATIONS

"Moving document collections online: The evolution of a shared repository"; Randall H. Trigg, Jeanette Blomberg, Lucy Suchman, *Proceedings of the Sixth European Conference on Computer–Supported Cooperative Work*, Sep. 12–16, 1999, Copenhagen, Denmark.

U.S. Appl. No. 09/942,666, filed Aug. 31, 2001, Rieffel et al.

Poon et al., "Scribbler: A Tool for Searching Digital Ink", CHI '95 Mosaic of Creativity, pp. 252–253, May 7–11, 1995.

Shipman et al., "Identifying Useful Passages in Documents based on Annotation Patterns", FX Palo Alto Laboratory, pp. 1–8.

Bederson et al., "Pad++: A Zooming Graphical Interface for Exploring Alternate Interface Physics", UIST, pp. 17–26, Nov. 2–4, 1994.

* cited by examiner

*Primary Examiner*—Matthew C. Bella
*Assistant Examiner*—Tam Tran
(74) *Attorney, Agent, or Firm*—Oliff & Berridge, PLC (57) ABSTRACT

A system for automatic emphasis of freeform annotations contained within an electronic document is performed based on a determined importance of each annotation. The importance of each annotation is determined by a mark parser that groups, types and ranks each of the annotations. A weighted value is assigned to each grouped, ranked and typed annotation based on temporal and spatial information. The display characteristics of the weighted annotation is altered based on the weighted value.

24 Claims, 9 Drawing Sheets

FIG. 1

[13] More importantly, the expectations
of privacy of covered employees are dimin-
ished by reason of their particapation in an
3. When employees produce the blood and

MULTIPLE IMPLEMENTS USED TO MARK TEXT

FIG. 2C

A READER'S EXTRA MARK THAT INDICATES
IMPORTANCE

FIG. 2A

[5] US, at 478-479; what 246 at 3169
More importantly, the expectations
of privacy of covered employees are dimin-
ished by reason of their particapation in an
Skinner and Vidal Ramb, we characterized the

HIGHLIGHTED AND UNDERLINED TEXT SHOWS
IMPORTANCE NOTED IN MULTIPLE READINGS

FIG. 2B

[13] More importantly, the expectations
of privacy of covered employees are dimin-
ished by reason of their particapation in an
3. When employees produce the blood and Freeform annotation in margins

CONTENTS ECHOED BY MARGINELIA

FIG. 2D

Privacy of Employees

The Expectations Of Privacy

[13] More importantly, the expectations of privacy of covered employees are diminished by reason of their particapation in an ~~When employees produce the blood and more importantly, the expectations of privacy of covered employees are diminished by~~ reason of their particapation in an when employees produce the blood. ~~More importantly, the expectations of privacy of covered employees are diminished by reason of their particapation~~ in an
When employees produce the blood. More importantly, the expectations of privacy of covered employees are dimin ished by reason of their particapation in an. When employees produce the blood and more importantly, the expectations of privacy of covered employees are diminished by reason of their particapation in an
    When employees produce the blood and more importantly, the expectations of privacy of covered employees are diminished by reason of their particapation in when employees produce the blood and more importantly, the expectations of privacy of covered employees are diminished by reason of their particapation in an
→ (When employees produce the blood and more importantly, the expectations of privacy of covered employees are diminished by reason of their particapation in an when employees produce the) ✗ handwritten annotation in margin
blood. More importantly, the expectations of privacy of covered ~~employees are diminished by reason of their particapation in an When employees produce the blood. More importantly, the expectations of privacy of covered employees are diminished~~ by reason of their particapation in an. When employees produce the blood and more importantly, the expectations of privacy of covered employees are diminished by reason of their particapation in an
    When employees produce the blood and more importantly, the expectations of privacy of covered employees are diminished by reason of their particapation in when employees produce the blood ✶ ✶

When employees produce the blood and more importantly, the expectations of privacy of covered employees are diminished by reason of their particapation in when employees produce the blood and More importantly, the expectations of privacy of covered More handwritten annotation in margin

SYSTEMS AND METHODS FOR AUTOMATIC EMPHASIS OF FREEFORM ANNOTATIONS

This non-provisional application claims benefit of U.S. Provisional Application No. 60/318,826 filed Sep. 14, 2001.

BACKGROUND OF THE INVENTION

1. Field of Invention

This invention generally relates to systems and methods for emphasizing high-value annotations in a freeform environment.

2. Description of Related Art

Conventional user interfaces for digital libraries tend to focus on retrieval. That is, users may retrieve documents online or on a display screen. However, the users then must print the document and mark-up or annotate the important passages/phrases within the document by hand. Annotations can help the reader understand the document contents in a quick glimpse, provide a more recognizable structure for the reader's own train of thought and/or focus a reader to the most pertinent and useful portions of a longer document.

As a reader marks the document, a reader's annotations are not equally important. That is, the marks readers make have different functions and different degrees of value. The difference in degrees of value allows a user to personalize a document so that the main passages, ideas or important citations standout in summary of the entire text. Subsequently, an automatic electronic outline of the document can be produced based on the annotations.

SUMMARY OF THE INVENTION

Numerous methods of displaying and presenting annotations in documents have been attempted. For example, thumbnails and other representations of content have been used. However, these methods generally rely on the form of the annotation rather than the importance and/or value of the passage as indicated by the type and/or amount of annotation.

U.S. patent application Ser. No. 08/929,427, incorporated herein by reference in its entirety, discloses a method for detecting and extracting freeform annotations for use in organizing a reader's annotations into meaningful structure. However, just as in other collaborative applications, the methods and systems disclosed in the '427 application do not distinguish high-value or important passages or annotations from other, lower value passages or annotations, as indicated by the type and/or amount of annotations. These methods and systems are only able to note and extract the annotation itself or the passage that an annotation is associated with.

Figure 1:
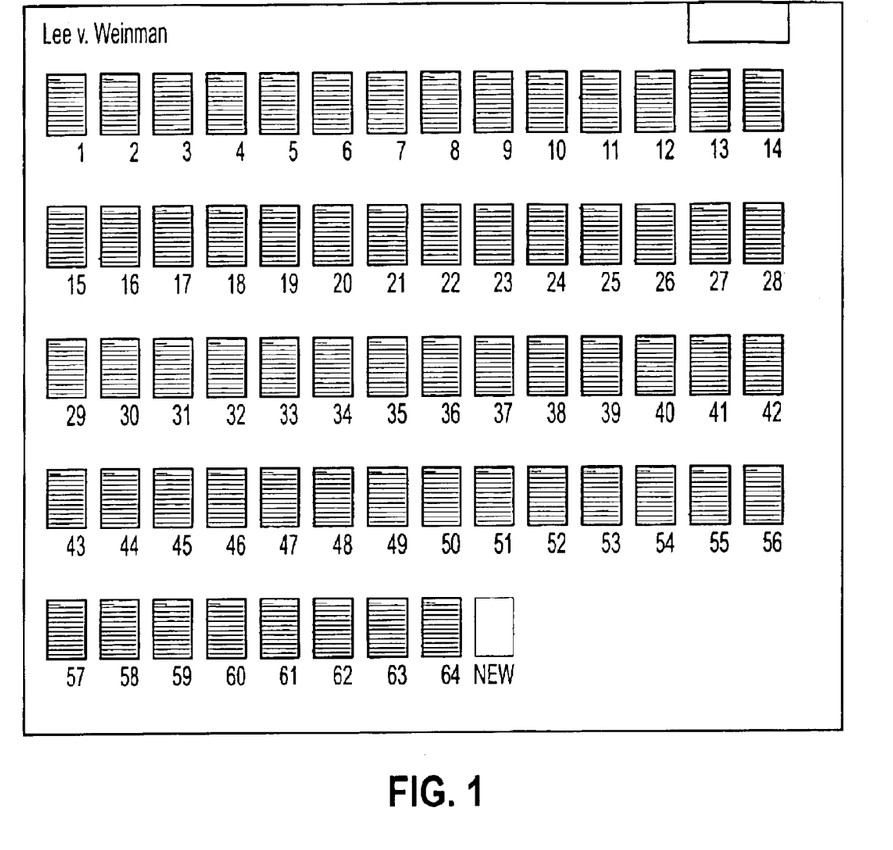
FIG. 1 is an exemplary representation of a typical multi-thumbnail view of a long document that has been annotated.
Figure 2A:
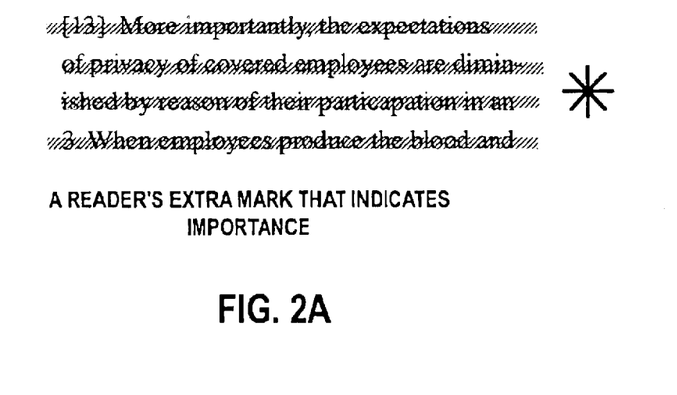
FIG. 2 illustrates various examples of annotation styles employed by different readers.
Figure 2B:
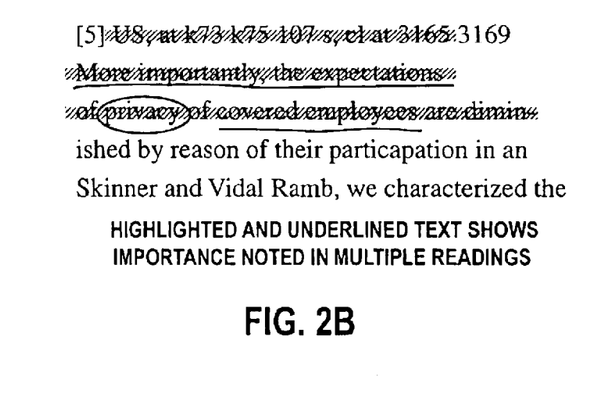
Figure 2C:
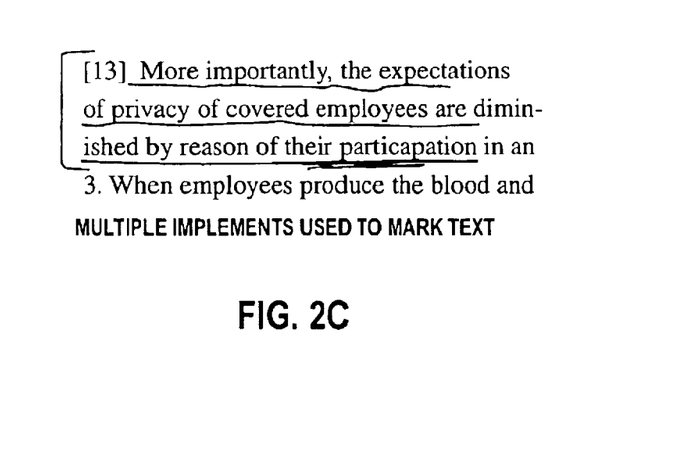
Figure 2D:
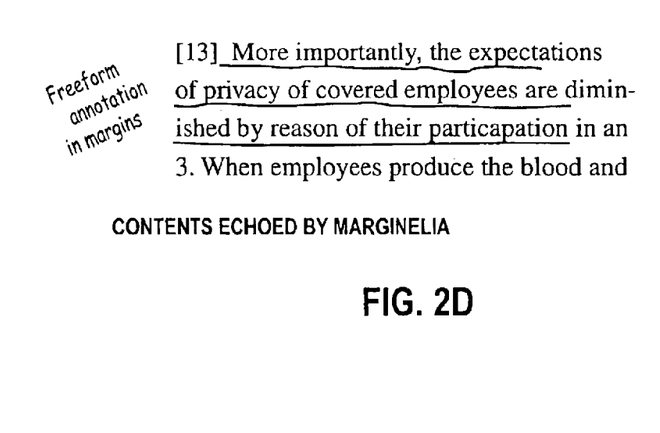

As a result, in these methods and systems, the form of the annotation itself suffers from the transformation. For example, as shown in FIG. 1, a multi-thumbnail display is typically used to show passages of a long document. However, based on this multi-thumbnail display, a user cannot discern which pages or sections of the document are of particular importance. More particularly, the highlighted portions do not stand out. In other examples, the function of an annotation, i.e., to convey the annotator's belief about the importance or relevance of the annotation and/or corresponding passage, is lost because the annotation marks are not distinguishable. That is, the margins are no longer readable and every annotation appears to have the same weight and value.

Therefore, the inventors have discerned that a system that is able to rank a series of detected freeform annotations according to importance and to display the importance of the annotations can improve the usefulness of the annotations.

This invention provides systems and methods that detect and emphasize high-value freeform annotations.

This invention separately provides systems and methods that identify important, or high-value, annotations.

This invention separately provides systems and methods that mark and/or indicate determined high-value annotation in a recognizable format.

In various exemplary embodiments of the systems and methods according to this invention, the particular annotation style that was used by a particular user to create the annotations in a document is determined. This annotation style can be individual to a particular person who created the annotations or could be a standardized style. Once the annotation style is determined, such that high-value annotation marks can be distinguished from low-valued annotation marks, the annotations within the document are analyzed to locate the high-value annotation marks.

In various exemplary embodiments, the high-value annotation marks can be distinguished from the low-valued annotation marks based on statistical analysis, time stamp information, handwriting detection and/or any other technique for categorizing the annotations that is able to separate the high-value annotations from the remaining annotations.

These and other features and advantages of this invention are described in or are apparent from the following detailed description of the apparatus/systems and methods according to this invention.

BRIEF DESCRIPTION OF THE DRAWINGS

Various exemplary embodiments of this invention will be described in detail, with reference to the following figures, wherein:

FIG. 3 is a portion of an exemplary document containing annotations;

DETAILED DESCRIPTION OF EXEMPLARY EMBODIMENTS

Reduced representations, such as, for example, thumbnails, graphical overviews, outlines, and summaries, are used in many interfaces. These interfaces allow users to see and interact with many documents, or many pages of a single document, at one time on a normal-sized display. When readers mark on documents, readers indicate passages that are important either to the reader or to others. Some of these annotations are of especially high-value, while others retain little meaning outside of the specific reading. Emphasizing high-value annotations according to the systems and methods of this invention, after automatically detecting such high-value annotations according to the systems and methods of this invention, can enhance reduced document representations. Emphasizing the high-value annotations helps eliminate noise from the presentation of a reduced representation, while allowing users to zero in on relevant portions of a long document or extensive collection of documents.

FIG. 1 shows a set of thumbnails that represent the individual pages of a long document. This thumbnail representation has been taken from the XLibris™ document reader, available from Fuji Xerox, Tokyo Japan, but it is a common way to represent documents that is used in scanning front-end programs like Pagis (http://www.pagis.com/home.html), rendering programs like Adobe Acrobat (http://www.adobe.com/prodindex/acrobat/), or document management systems like Integrator, which is disclosed in "Moving document collections online: The evolution of a shared repository", R. Trigg et al., Proceedings of ECSCW'99. The pages of the particular document shown in the thumbnails illustrated in FIG. 1 have been read and annotated, or marked up, by a user. FIG. 1 illustrates that it is difficult to distinguish one page from another, because many of the pages have been marked up using a highlighter, and the highlights all look just about the same. For example, if a user were trying to find an important annotated passage early in the document, it would be difficult to choose among pages 17 through 25 of the document shown in FIG. 1. It is a high-overhead operation for the user to examine each page by expanding that page to full size. Yet the user has already indicated which of these pages the user is interested in when the user initially read and highlighted this document. Pages 17 and 22 have starred passages. Yet these star annotations are not visible in a compact overview, such as the one shown in FIG. 1 that is necessary to present all the pages of the document as thumbnails.

It is important to note that none of the methods described below rely on the initial annotated document or marking method being annotated using digital ink. In fact, it is easy to envision a first step in which the marked-up documents are scanned. Annotations can be detected and "peeled off" using the "Annotation Lifting" technique described in U.S. Pat. No. 5,692,073, incorporated herein by reference in its entirety.

Many diverse user interfaces to information systems use reduced representations of documents. For example, programs that act as the front end to scanners, such as, for example, "Pagis" or Visioneer's "PaperPort" document management system, often use thumbnails as one of the principle modes for presenting multiple pages, or multiple documents at the same time. Databases of images, such as, for example those provided by "AMICO", as disclosed at hhtp://www.amico.org/home.html, present search results this way as well.

Other tools for manipulating documents, such as, for example MS Word and MS PowerPoint, use document structure to construct a reduced representation. Tagged text, such as, for example, section headings, or discrete boundaries, such as, for example, individual PowerPoint slides, may be used by these programs to generate a table of contents or an outline that allows a user to see and interact with more than one page of a document at a time. Often retrieval tools, such as, for example Altavista, present search results as computed reduced document representations such as summaries. The reduced representations correspond to the gist of the documents.

It should be appreciated that these examples are not intended to limit the applicable types of reduced representations that the systems and methods according to this invention might be applied to, but rather to show their range.

While a user many extensively annotate a document, these annotations do not all have the same worth to the reader over time. Some annotations are transient traces of readers' attention as they make their way through a difficult narrative. Other annotations single out passages that provoke a reaction in the reader. Still other annotations are commentary, useful during subsequent readings or in future activities. For example, a lawyer may star passages in a case that the user anticipates will be quoted verbatim in a brief that the lawyer is writing.

FIG. 2 is a view of an exemplary annotation style that could be employed by a user. FIG. 2 illustrates the varying methods for annotating a document that can be analyzed and emphasized using the freeform annotation emphasis systems and methods according to this invention. The annotation style in the upper left hand passage of FIG. 2 uses an asterisk in the margins of the document adjacent to this portion or passage of the document to indicate the importance of this particular portion or passage. In various exemplary embodiments according to this invention, the asterisk is used an objective indication that the highlighted portion or passage of the document is of high-value.

The upper right hand passage of FIG. 2 shows an alternate annotation style. For example, circles and underlines within a previously-highlighted portion or passage of the document indicates the increased importance and/or emphasis of sections of the previously-highlighted portion or passage of the document. In the lower left hand passage shown in FIG. 2, a user's bracketing of a previously underlined portion or passage of a document is used to indicate a portion or passage of the document having increased importance. Similarly, double underlining of the portion or passage may be used to indicate the increased importance of the passage. In the lower right hand passage shown in FIG. 2 a freeform annotation such as handwriting in the margins indicates an increased importance or high-value of the adjacent portion or passage of the document.

FIG. 3 shows an exemplary representation of an electronic document. The upper half of the page shown in FIG. 3 contains digital annotations, such as underlines and margin bars. These annotations may have a lesser value than the written annotations on the page, and the adjacent text passage, which has been circled and pointed out with arrows. Parts of the page are enumerated within the text and are also annotated with marginalia to call such portions of the text out. The subsequent commentary on the page may also be of high value as well, although it has not been emphasized to the extent the earlier marginalia has been. This example illustrates the varying value and relevance of reader's annotations for activities including re-reading and writing.

The first aspect to notice in the page shown in FIG. 3 is simply how heavily annotated the page is. There is little on the page that doesn't bear the reader's marks. This example also illustrates several stages of processing that must occur to detect the high-value annotations. First, the reader's marking style needs to be characterized. This allows the value of the annotations to be normalized. To normalize the value of the annotations, the frequency of the reader's marks within the context of the document and the page need to be determined and the types of marks the reader is prone to make should be identified. In particular, a determination should be made concerning whether the reader usually underlines, highlights, uses margin bars, writes symbols in the margin, and/or composes extensive marginalia. If a reader normally makes few marks on a document, any highlighted passage is likely to be high-value annotation. Alternatively, if a reader uses a highlighter on most pages, any single instance of highlighting is not apt to be that important. Characterization of style allows weights to be assigned to individual annotations to assess the relative value of these annotations.

After a reader's style has been characterized, the properties of the annotations themselves should be analyzed to detect which types of annotation among the various types of annotations made by that reader represent high-value to that reader. To determine which types of annotations are high-value annotations to the reader, a heuristic assessment of annotation types, used this time with a focus on what the distinctions between the annotations mean, for example, marks over text, like highlighting and underlines, and marks in the margin, like commentary and symbols. Further distinctions among marginalia can be made according to properties like extent (i.e., how much space the annotations occupy), shape (for example, length and width), placement (i.e., where on the page the annotations are relative to the source document) and other known or later developed characteristics. Furthermore, if it is desirable, the annotations themselves can be analyzed to determine the canonical shapes. For example, in FIG. 3, the pair of asterisks or the circled "1" and "2" may be detected using shape recognition algorithms, such as that described in U.S. Pat. No. 5,687,254 incorporated herein by reference. Handwriting recognition, even if it is not wholly accurate, readily allows the relative length of a particular piece of commentary to be determined. In general, readers find longer commentary to be of greater value than shorter commentary.

Finally patterns of marking can be used to help assess relative value. For example, passages associated with more than one type of mark can be identified. In FIG. 3, it is possible to detect the circle, the arrows, and the fact that there is a marginal note adjacent to these symbols. The confluence of these factors, i.e., that the reader circled the text rather than underlined it; that the reader marked it with symbols on both sides; and that the reader wrote marginalia, allow a determination to be made that the reader thought that the passage in the text is particularly important.

Emphasis of high-value annotations is based on a family of techniques usable to make a reader's high-value marks more apparent in reduced document representations. Literal exaggeration of the color (by saturation) or size of a reader's high-value marks annotation is one simple way of making such high-value annotation more visible in an overview. This exaggeration may be performed at the same time that other annotations are de-emphasized, for example, by making the color of such lower-valued annotations less saturated. Alternatively, or additionally, such high-value annotation marks may be stylized or iconified. If a reader regularly uses asterisks to call out important passages to appear in a subsequent writing task, these asterisks can be made more visible by substituting a conspicuous iconic surrogate, such as, for example a "*" in the reduced representation. Third, and more generally, a whole family of predictable mappings may be applied to transform such high-value annotation into something more visible. Yellow marks—invisible in the reduced representation—may be transformed to red marks. Similarly, important marks within a passage may be transformed into font characteristics in a table of contents. Fourth, the lower-value marks may be omitted or faded. Finally, the important markings may be used as the basis for further processing, such as automatically constructing a summary.

The inventors have discovered that users use two main categories of annotation types. The first category includes selection marks, such as highlighting, underlining, circling, and margin bars that identify a document passage. The second category includes interpretative marks, such as comments and symbols that respond to the content. Of course, the roles of these two classes of marks are not completely distinct, since the act of selecting text out of a body is an interpretive act and marginalia naturally select text nearby as the focus of attention.

These observations lead to the design of a mark parser that identifies structure and emphasis in pen stroke information of a reading appliance, such as, for example, XLibris. The mark parser categorizes groups of marks into annotation types and constructs a passage-based grouping of annotations that are then usable to identify high-emphasis sections of the document.

Figure 4:
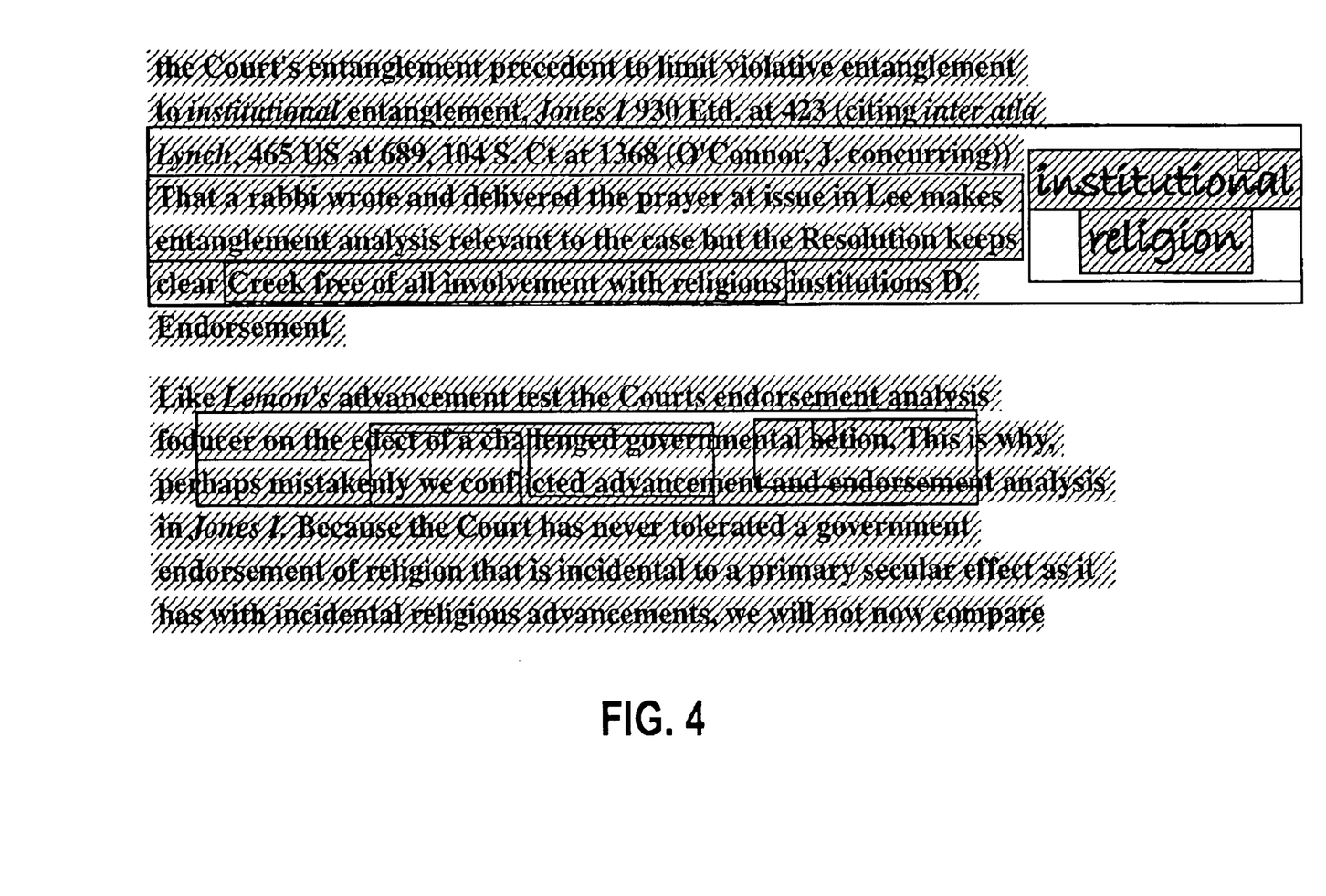
FIG. 4 is an exemplary representation of annotations clustered according to various exemplary embodiments of the systems and methods of this invention.

The text and annotations shown in FIG. 4 illustrate how the mark parser categorizes groups of marks, constructs groups of annotations, and identifies high-value marks. In this example, the red ink marks should be identified as comments that are attached to the same passage as the neighboring highlighter marks. This would mark the two passages as multimarked passages and would provide relative weightings of perceived emphasis that are, for example, emphasis values, for comparing these and other marked passages.

It should be appreciated that digital ink annotations include data representing the temporal sequence of the marks, which can be advantageously used by the mark parser in parsing.

The mark parser implements a three-pass process of grouping, typing, and ranking the relative importance of the reader's annotation marks. During the first pass, the mark parser clusters time-ordered marks into low-level groups based on time, distance, and/or pen type. In this stage, the individual pen strokes can be combined into clusters that can be considered to be a single annotation.

In the first pass, the mark parser uses a function of temporal and spatial distance to determine breaks in the grouping of marks. The pen-type differences are used at least in part in determining the temporal and spatial gaps within the stroke sequence, since highlighters and pens are used differently in annotation. In general, the temporal gaps between related marks, such as those strokes constituting a single annotation, are larger when using the pen than when using the highlighter. This may reflect the fact that readers tend to reflect more when they write interpretive comments and symbols than when they simply highlight a passage. During the first stage, the parser also groups pen strokes that represent temporally contiguous, but spatially distinct, marks, such as multi-line comments. This process results in a one-level or multi-level hierarchical clustering of marks into groups, as shown in FIG. 4.

It should be appreciated that the top set of highlighter strokes in FIG. 4 was broken up due to a large temporal gap between the strokes, as was the bottom comment. There is a trade-off in setting the boundaries for clustering between errors where strokes that should be grouped together end up in separate clusters and errors where unrelated strokes are put in the same cluster. Because the later passes of the mark parser combine clusters into higher-level structures, erring on the side of having more clusters seems appropriate as these clusters are likely to be grouped together later on anyway.

During the second pass, the mark parser categorizes the mark clusters into annotation types using the pen type, the number of component marks, and/or the size and/or the shape of the extent of the cluster. In the example shown in FIG. 4, the six high level clusters, shown in rectangles, should include three highlight annotations and three comment annotations. In various exemplary embodiments, the stroke types can be based on the pen type, the number of overlapping words, and/or the stroke's shape. For example, clusters composed of five or more pen marks, as opposed to highlighter marks, are considered comments. When the clusters are categorized, emphasis values are also assigned. One exemplary embodiment of a list of category types and the base emphasis values assigned to these category types is shown in Table 1, below.

These are three basic emphasis value ranges for the emphasis values assigned to the mark clusters. Marks that roughly identify an area of interest, such as, for example, area highlight and area circle, are assigned emphasis values that are in a low range. More focused selection marks, such as, for example, underline, margin bar, highlight, and circle, are assigned values in an intermediate range. The interpretive marks, such as, for example, comments, symbols, and callouts, are assigned values in a high range. The initial emphasis values are chosen so that passages with a combination of mark clusters would be ranked higher than or equal to passages marked with only one type of cluster. In the example shown in FIG. 4, the three comment clusters have an emphasis value of 20, while the three highlighter clusters have emphasis values of 15.

During the third pass, the mark parser groups each mark cluster with the spatially appropriate passage or passages from the source text. Any overlap between the passages for a number of mark clusters will cause those mark clusters to be grouped into a single multimark cluster, creating the highest-level entities in the resulting parse tree. Passages are then associated with individual strokes by identifying the sentence nearest the stroke, with some preference for sentences next to the marks. Thus, a greater horizontal gap is allowed relative to the vertical gap. In the example shown in FIG. 4, the highlighter and comments are attached to the same sentence in the text. As a result, the two passages are correctly recognized as a multimark annotation or cluster, as shown by blue rectangles in FIG. 4.

The emphasis value of such a multimark cluster is the sum of the emphasis values of the component clusters of that multimark cluster. Thus, the two marked passages in the example shown in FIG. 4 have emphasis values of 50 and 55 for the top and bottom passages, respectively.

FIG. 4 also illustrates one exemplary embodiment of the clustering methods used in various exemplary embodiments of this invention. In FIG. 4, the lowest level of clusters are represented by the smaller interior boxes, while the higher level clusters are represented by the larger, more encompassing boxes. The larger boxes have types and emphasis values attached. Overlap between the clusters will cause the overlapping clusters to be grouped into a multi-mark cluster. Multi-mark clusters are assigned the highest values of the groups. For example, the highlighter and handwritten comments are attached to the same sentence in the text, so the two marks are correctly recognized as multi-marks, as shown by the larger rectangle clustering both marks together. As the example shown in FIG. 4 illustrates, there is ample opportunity for mis-recognition in the parsing process. Stroke clustering, attaching type information, and grouping passages with clusters are heuristic. Nevertheless, the overall results match the desired outcome. Because lower levels of the parse may contain incorrect sub-groupings, it is important to design uses for the recognized structure that do not rely on precise clustering results. Recognizing groups of marks, categorizing the types of marks, and attaching emphasis values to the groups creates the potential for a variety of interface-level features. Four examples of such features are: (1) a presentation that draws the reader's attention to the location of high-value annotations in a thumbnail overview of the document; (2) a presentation that combines annotations to help people share the annotations more effectively; (3) a mechanism that selects meaningful groupings of annotations or associated text; and (4) a mechanism that helps people search through annotations according to a specified pattern.

Figure 5:
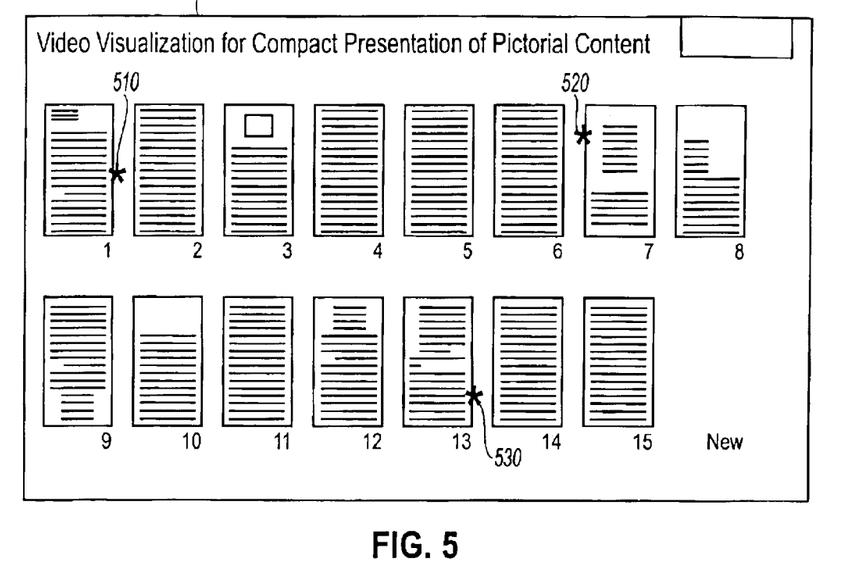
FIG. 5 illustrates a first exemplary embodiment of a multi-thumbnail view having high-value annotations determined and emphasized according to various exemplary embodiments of the systems and methods of this invention.

FIG. 5 is a first exemplary visual representation of a multi-thumbnail view of a document 500 generated according to the systems and methods of this invention. In FIG. 5, high-value passages have been emphasized by an icon. The thumbnail images show an asterisk icon 510 to indicate a high-value annotation associated with a first portion of document 500. The asterisk icon 520 indicates a second high-value annotation associated with a second portion of the document 500. The asterisk icon 530 indicated a third high-value annotation associated with a third portion of a document 500. It will be apparent that each icon can be complemented using any known or later-developed icon or display attribute for indicating high-value without departing from the spirit or scope of this invention.

Figure 6:
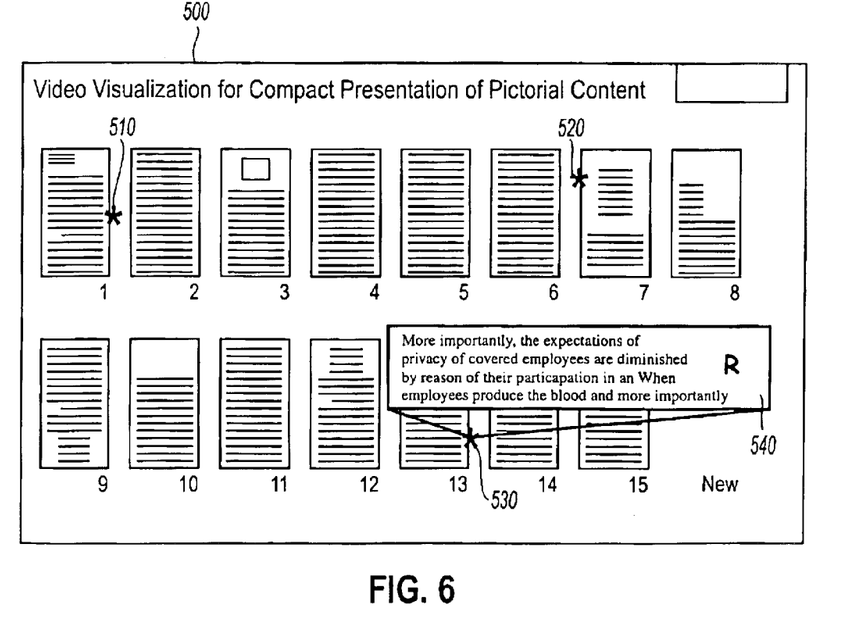
FIG. 6 illustrates a second exemplary embodiment of displaying in greater detail an annotated portion that corresponds to a selected high-value annotation according to various exemplary embodiments of the systems and methods of this invention.

FIG. 6 is a second exemplary visual representation of a multi-thumbnail view of the document 500 generated according to the methods and systems of this invention. In FIG. 6, high-value passages or portions of the document 500 have again been emphasized by icons. For example, the asterisk icon 510 indicates the first high-value annotation associated with the first portion or passage of document 500. The asterisk icon 520 indicates the second high-value annotation associated with the second portion or passage of the document 500. The asterisk 530 indicates the third high-vale annotation associated with the third portion or passage of document 500. A call-up 540 displays the third high-value annotation in an expanded view while maintaining the reader's orientation of the document 500.

Figure 7:
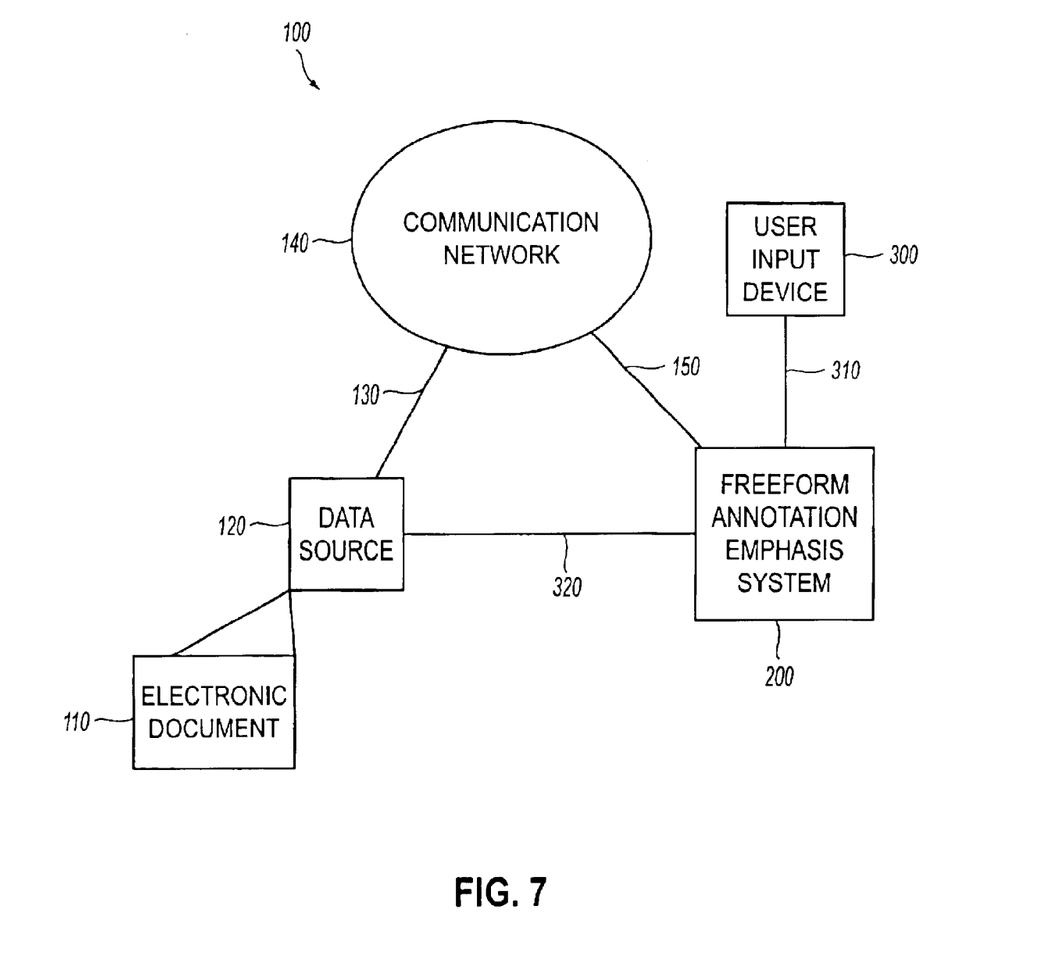
FIG. 7 illustrates one exemplary embodiment of a system usable to emphasize freeform annotations according to this invention.

FIG. 7 shows one exemplary embodiment of a system 100 that includes a freeform annotation emphasis system 200. As shown in FIG. 7, one or more user input devices 300 are connected to the freeform annotation emphasis system 200 via one or more links 310. The one or more user input devices 300 can be any known or later-developed device usable to input data and/or commands, such as a keyboard, a mouse, a voice recognition system, a digital ink pen, a trackball, a track pad or the like. The freeform annotation emphasis system 200 is connected to a data source 120 of the system 100 either directly over a link 320 or over links 130 and 150 and a communication network 140 of the system 100. The links 130, 150, 310 and 320 and the communication network 140 can be any known or later-developed device or system usable to connect the user input device 300 and the data source 120 to the freeform annotation emphasis system 200, including a direct cable connection, a connection over a wide area network or a local network, a connection over an intranet or a connection over an extranet, a connection over the Internet, or a connection over any other distributed processing network or system. In general, the links 130, 150, 310 and 320 and the communication network 140 can be any appropriate known or later-developed connection system or structure.

The data source 120 contains an electronic document 110. Media data, such as the electronic document 110, can be retrieved by the freeform annotation emphasis system 200 from the data source 120 and collaboratively shared by the components of the freeform annotation emphasis system 200. It should be appreciated that data source 120 can be a digital camera, a scanner, locally or remotely located computer, or any other known or later-developed system usable to generate electronic data or document information, such as annotation information. Similarly, the data source 120 can be any suitable device that stores and/or transmits electronic image data, such as a client or a server of a network. The data source 120 can be integrated with the freeform annotation emphasis system 200 or may be remotely connected to the freeform annotation emphasis system 200, such as over the communication network 140.

It should also be appreciated that the electronic document 110 provided by the data source 120 may be a scanned image of a physical document or a photograph, video recordings, media data created electronically using any software, such as word processing software, or media data created using any known or later-developed programming language and/or computer software program, the contents of an application window on a user's desktop, e.g., the toolbars, windows decoration, and spreadsheet shown in a spreadsheet program, live broadcasting of a video image, or any other known or later-developed electronic document. Moreover, the electronic document may be an analog image and/or object, such as a picture, drawing, and any object on which digital ink maybe used.

Figure 8:
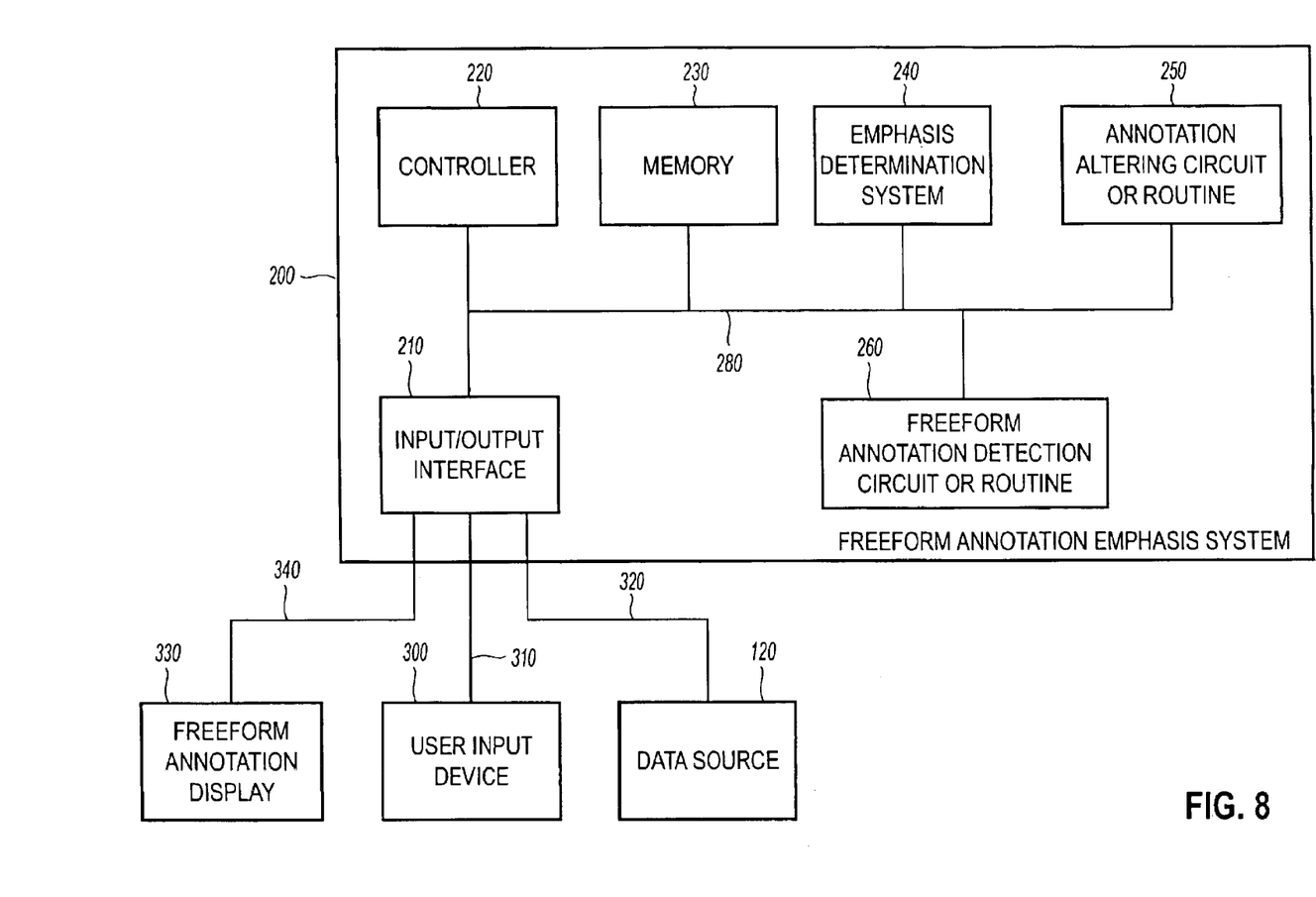
FIG. 8 is a block diagram showing one exemplary embodiment of a freeform annotation emphasis system according to this invention.

FIG. 8 shows a block diagram of one exemplary embodiment of the freeform emphasis system 200 according to this invention. As shown in FIG. 8, the one or more user input devices 300 are connected to the freeform annotation emphasis system 200 through an input/output interface 210 via the one or more communication links 310. The data source 120 is also connected to the freeform annotation emphasis system 200 through the input/output interface 210 via link 320.

The freeform emphasis annotation system 200 includes the input/output interface 210, a controller 220, a memory 230, an emphasis determination circuit or routine 240, an annotation altering circuit or routine 250, and a freeform annotation detection circuit or routine 260, all of which are interconnected over a data and/or control bus 280. A display device 330 is also connected to the input/output interface 210 via a link 340.

The controller 220 controls the operation of the other components of the freeform emphasis system 200. The controller 220 controls the flow of data between other components of the freeform annotation emphasis system 200 as needed. The memory 230 can store information coming into or going out of the freeform annotation emphasis system 200, may store any necessary programs and/or data implementing the functions of the freeform annotation emphasis system 200, and/or may store data and/or annotation information at various stages of processing.

The memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The freeform annotation detection circuit or routine 260 is activated by the controller 220 to detect and identify annotations contained in the electronic document 110 provided by the data source 120, as outlined above. The freeform annotation detection circuit or routine 260 can be implemented using the systems and methods disclosed in U.S. patent application Ser. No. 08/821,311, incorporated herein by reference in its entirety, or any other known or later-developed system for detecting an annotation contained within a document. It should be appreciated that the freeform annotation detection circuit or routine 260 can optionally be omitted from the freeform annotation emphasis system 200 should the data source 120 provide the annotation information with the electronic document 110. It should also be appreciated that the freeform annotation detection circuit or routine 260 works equally as well with all types of electronic information. For example, if the data source 120 is a scanner, the freeform annotation detection circuit or routine 260 may detect the annotations from within the scanned document, as outlined above.

The freeform annotation detection circuit or routine 260 can capture and/or determine annotation information, such as the time a digital annotation was made, the physical size of the annotation the color or other visual attribute of the annotation and/or the pen type of a digital ink device or a physical device used to create the annotation.

The emphasis determination circuit or routine 240 inputs the electronic document 110 under control of the controller 220, either from the memory 230 or the input/output interface 210. The emphasis determination circuit or routine 240 retrieves the annotation information determined by the freeform annotation detection circuit or routine 260, either directly from the freeform annotation detection circuit routine 260, or from the memory 230. The emphasis determination circuit or routine 240 groups the annotations into first groups of marks, such as by the time the annotation was made, the physical size of the annotation the color or other visual attribute, and/or the pen type used in making the annotation. Using this information, the emphasis determination circuit or routine 240 groups the marks into one or more higher level groups, as outlined above, and then ranks and types the relative importance of the marks, as outlined above. The emphasis determination circuit or routine 240 then assigns a weighted value to the higher-level groups. Based on the assigned weighted values, one or more high-value annotations are determined.

The annotation altering circuit or routine 250 then alters those high-value annotations, adds special icons, or the like, as outlined above. The annotation altering circuit or routine 250 is activated by the controller 220 to alter the appearance of the annotations and/or to add special icons, or the like, that will be displayed to indicate the importance of an annotation, as determined by and provided by the emphasis determination circuit or routine 240. The annotation altering circuit or routine 250 can be implemented using the systems and methods disclosed in U.S. patent application Ser. No. 09/942,666, incorporated herein by reference in its entirety, or any other known or later-developed method for altering one or more characteristics of an annotation and/or for adding special icons, and the like, to a corresponding reduced representation.

Figure 9:
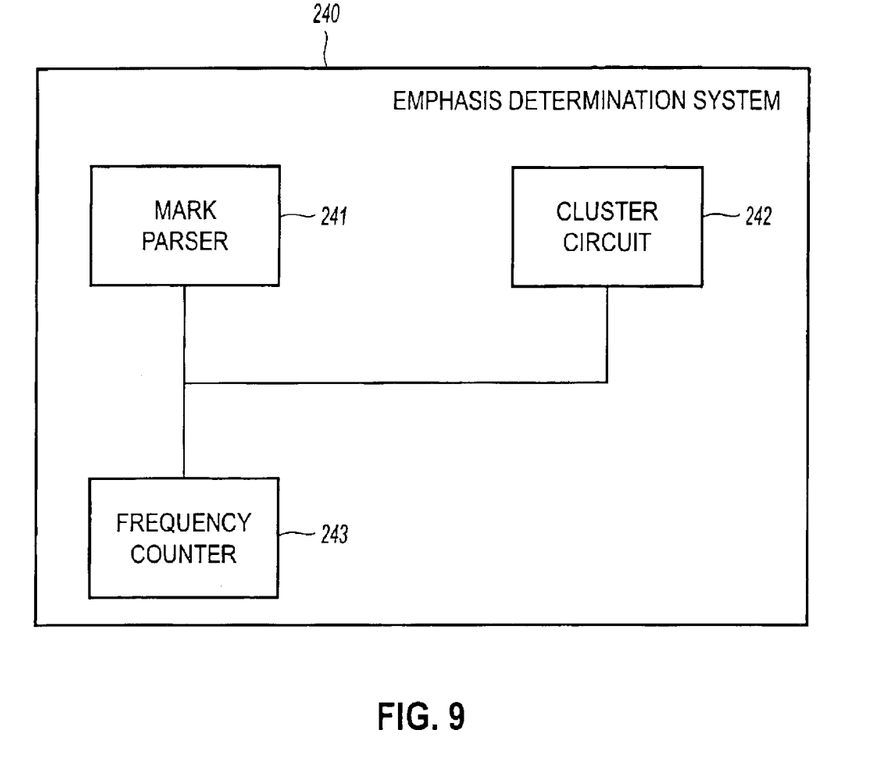
FIG. 9 is a block diagram showing an exemplary embodiment of an emphasis determination system according to the exemplary freeform annotation emphasis system of FIG. 8.

FIG. 9 shows in greater detail one exemplary embodiment of the emphasis determination circuit or routine 240. As shown in FIG. 9, the emphasis determination circuit or routine 240 includes a mark parser 241, a mark clustering circuit or routine 242, and a frequency counter 243.

In the exemplary embodiment shown in FIG. 9, the frequency counter 243 analyzes the annotation information provided by the freeform annotation detection circuit or routine 260 to determine the frequency of occurrence of each of one or more particular types of annotations contained within the electronic document 110 provided by the data source 120. The mark parser 241 uses this frequency information to characterize the reader's particular style of annotation. For example, the frequency counter 243 may determine that of the annotations within the electronic document 110, 87% of the annotations are highlighting, 10% of the annotations are circlings, 2% are numbers and 1% are handwritten notes. Once the frequency counter 243 determines this relationship, two methods of determining of the high-value annotations can be used by the mark parser 241, as outlined above.

In a first operation mode, the mark parser 241 can determine that the handwritten notes are of the highest value because the electronic document contains the fewest occurrences of the handwriting type digital annotations. The mark parser 241 thus indicates to the controller 220 that the handwritten notes are the high-value annotations. The annotation altering circuit or routine 250 alters those identified high-value annotations. For example, the handwritten notes can be shaded in red.

However, in a second, more complex mode of operation, the emphasis determination circuit or routine 240, after the frequency counter 243 determines the frequency information that represent a reader's annotation style, analyzes the properties of the annotations to detect which are high-value. To do this, the mark parser 241 inputs the frequency information from the frequency counter 243. The mark parser 241 identifies the structure of the group of annotations and emphasis as indicated, for example, by the user's frequency of use. The mark parser 241 then characterizes groups of annotations into annotation types and constructs a document-based grouping of annotations to identify the high-value sections of the document.

The mark parser 241 then uses the three-pass process outlined above. The cluster circuit or routine 242 operates collaboratively with the mark parser 241 during the first pass of the mark parser 241 to produce the one-level or multi-level hierarchical clustering of annotations into groups, as described above.

During the second pass, the mark parser 241 categorizes the marks into annotation types using, for example, but not limited to, pen type, the number of marks and/or the size and/or shape of the cluster.

During the third pass, the mark parser 241 groups the mark clusters with passages from the subject document. Any overlap between the passages for mark clusters will cause these mark clusters to be grouped into a multi-mark cluster. Multi-mark clusters are assigned the highest value of the groups.

In this exemplary embodiment, once the mark parser 241 assigns emphasis values to the annotations of the subject document, the emphasis determination circuit or routine 240 sends a command to the controller 220 to display the high-value annotations to the user. Table 1 depicts an example of emphasis values attached to annotation types.

TABLE 1

Emphasis Values attached to annotation types.

| Annotation Type | Emphasis Value |
| --- | --- |
| Underline | 15 |
| Margin bar | 15 |
| Highlight | 15 |
| Area Highlight | 10 |
| Circle | 15 |
| Area Circle | 10 |
| Comment | 20 |
| Symbol | 20 |
| Callout | 20 |
| Multi-mark | Sum of components |

Figure 10:
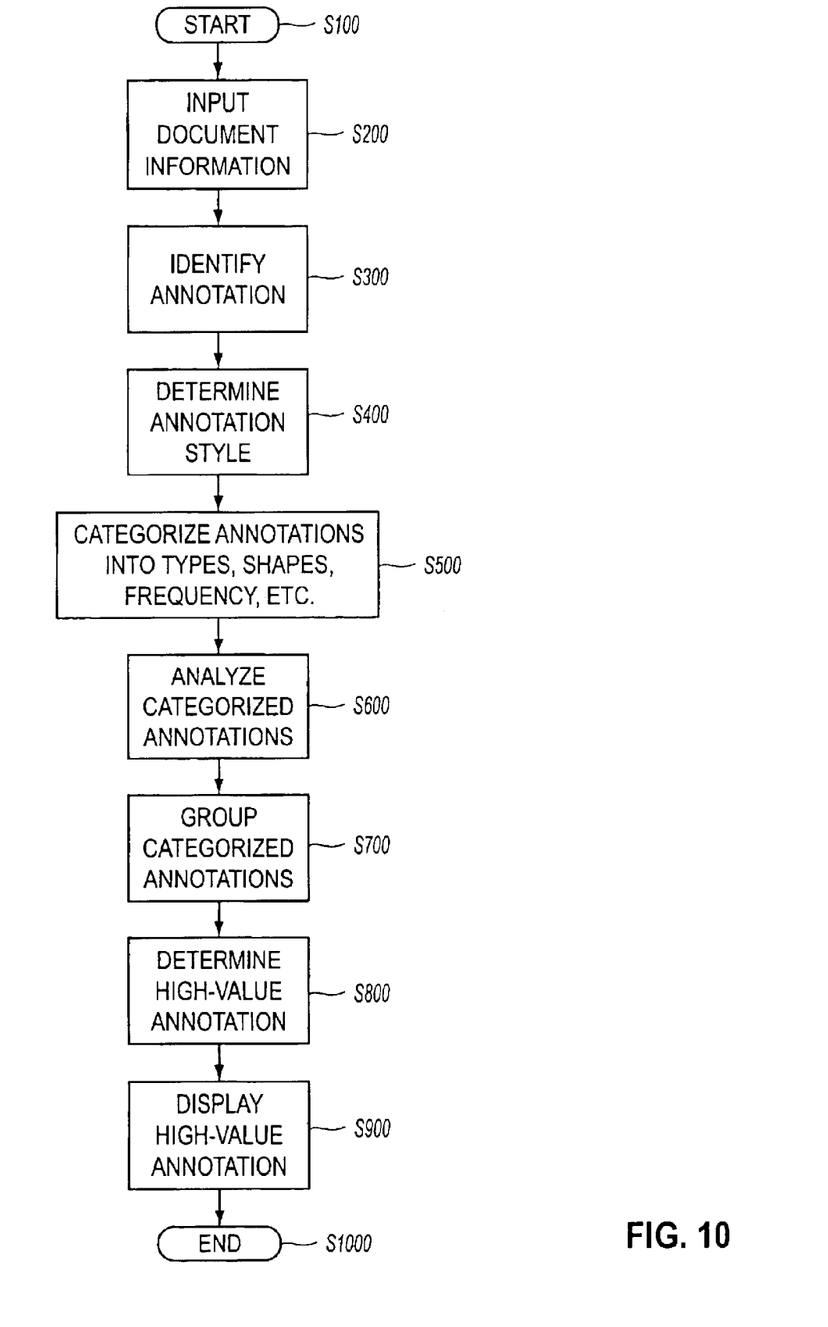
FIG. 10 is a flowchart outlining one exemplary embodiment of a method for freeform annotation emphasis.

FIG. 10 is a flowchart of one exemplary embodiment of a method for freeform annotation emphasis according to this invention. Beginning in step S100, operation continues to step S200, where an annotated document is input or selected for analysis and emphasis of the high-value annotations. Then, in step S300, the annotations in the document are identified, as outlined above. Next, in step S400, a reader's annotation style is determined. In various exemplary embodiments, the annotation information is parsed to determine, for example, frequency of occurrence of a particular mark. Operation then continues to step S500.

In step S500, the determined annotations are categorized, as outlined above. Next, in step S600, the categorized annotations are analyzed to determine any overlapping or adjacent annotations. Then, in step S700, the annotations are clustered together based on how the analyzed annotations overlap. Operation then continues to step S800.

In step S800, annotations are assigned values based on various criteria such as overlap of clusters, spatial size of the cluster or time between pen strokes. Then, in step S900, the high-value annotations based on the assigned values, are displayed to a user. Operation of the method then ends in step S1000.

It should be appreciated that these steps are described above for illustrative purposes only, and in various other exemplary embodiments many other methods can be employed to determine a high-value annotation for display.

In the various exemplary embodiments outlines above, the freeform annotation emphasis system 200 can be implemented using a programmed general purpose computer. However, the freeform annotation emphasis system 200 can also be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flow chart shown in FIG. 10, can be used to implement the freeform annotation emphasis system 200.

Each of the circuits and element of the various exemplary embodiments of the freeform annotation emphasis system 200 outlined above can be implemented as portions of a suitable programmed general purpose computer. Alternatively, each of the circuits and elements of the various exemplary embodiments of the freeform annotation emphasis system 200 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the freeform annotation emphasis system 200 outlined above will take is a design choice and will be obvious and predicable to those skilled in the art.

Moreover, the various exemplary embodiments of the freeform annotation emphasis system 200 outlined above and/or each of the various circuits and elements discussed above can each be implemented as software routines, managers or objects executing on a programmed general purpose computer, a special purpose computer, a microprocessor or the like. In this case, the various exemplary embodiments of the freeform annotation emphasis system 200 and/or each of the various circuits and elements discussed above can each be implemented as one or more routines embedded in the communication network, as a resource residing on a server, or the like. The various exemplary embodiments of the freeform annotation emphasis system 200 and the various circuits and elements discussed above can also be implemented by physically incorporating the freeform annotation emphasis system 200 into a software and/or hardware system, such as the hardware and software system of a web server or a client device.

Those skilled in the art will recognize many applications for the systems and methods according to this invention, including but not limited to display devices such as file browser devices, systems that display applications of a personal computer, handheld devices, and the like. In short, the invention has application to any known or later developed system or device capable of using digital ink or high-value annotations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for emphasizing freeform annotations, comprising:
   inputting received document data;
   inputting at least one freeform annotation in the received document data;
   determining from the at least one freeform annotation a reader annotation style;
   determining an importance of at least one of the at least one freeform annotation based on the determined reader annotation style; and
   outputting a reduced representation of at least a portion of the received document data and outputting a representation of at least one freeform annotation, the outputting of the representation of the at least one freeform annotation being based on the determined importance of that at least one freeform annotation.

2. The method of claim 1, further comprising assigning for each of at least one of the at least one freeform annotation a weighted value to that freeform annotation based on the determined importance of that freeform annotation.

3. The method of claim 1, further comprising, for each of at least one of the at least one freeform annotation, altering the output of that freeform annotation based on a weighted value associated with that freeform annotation.

4. The method of claim 3, further comprising treating a freeform annotation having a greater weight as a higher valued freeform annotation.

5. The method of claim 3, wherein altering the output comprises altering at least one of font size, font color, underlining, highlighting and iconization.

6. The method of claim 1, wherein inputting at least one freeform annotation comprises extracting characteristic information about at least one of the at least one freeform annotation, the characteristic information including at least one of at least a time stamp indicating when a freeform annotation was made, a physical size measurement of a freeform annotation and a type of device used to make a freeform annotation.

7. The method of claim 6, wherein determining from the at least one freeform annotation a reader annotation style comprises grouping a plurality of the at least one freeform annotation into at least one group of freeform annotations based on the extracted characteristic information.

8. The method of claim 7, wherein determining the importance of at least one of the at least one freeform annotation comprises:
   grouping a plurality of groups of freeform annotations into at least one level of higher level groups; and
   ranking and typing a relative importance of the plurality of groups.

9. The method of claim 1, wherein determining the importance comprises determining a frequency of occurrence of a particular type of each of at least one freeform annotation associated with the document data.

10. The method of claim 9, wherein determining the importance further includes:
    clustering a plurality of the at least one freeform annotations into one-level or multi-level hierarchical groups;
    categorizing the clustered plurality of freeform annotations into freeform annotation types; and
    grouping the categorized and clustered plurality of freeform annotations with passages from the document data, wherein an overlap between the grouped passages produce a multi-mark cluster.

11. The method of claim 10, further comprising assigning, for each of at least one of the at least one freeform annotation, a weighted value to each of the clustered, categorized and grouped freeform annotations.

12. The method of claim 11, wherein outputting a reduced representation further includes altering the output of the at least one freeform annotation based on the assigned weighted value.

13. A freeform annotation emphasis system that emphasizes high-value freeform annotations, comprising:
    a freeform annotation detection circuit or routine that detects and identifies at least one freeform annotation within electronic document data supplied from an electronic data source;
    an emphasis determination circuit or routine that ranks and types the relative importance of each of the at least one freeform annotations; and
    a freeform annotation altering circuit or routing that alters an output of at least one freeform annotation based on the determined importance of the at least one freeform annotation.

14. The system of claim 13, wherein the emphasis determination system comprises:

a frequency counter that determines a frequency of occurrence of a freeform annotation type within the document data;

a cluster circuit that produces one-level or multi-level hierarchical clustering of each of the at least one freeform annotations into groups; and a mark parser that types, ranks and groups each of the at least one freeform annotations, wherein the mark parser assigns a weighted value to the typed, ranked and grouped freeform annotations to indicate importance.

15. The system of claim 14, wherein upon detecting and identifying a freeform annotation, the freeform annotation detection circuit or routine captures freeform annotation information.

16. The system of claim 15, wherein the captured freeform annotation includes at least one of a time stamp indicating when a freeform annotation was made, a physical size of a freeform annotation and a type of device used to make the freeform annotation.

17. The system of claim 14, wherein the mark parser uses the frequency of occurrence information from the frequency counter to characterize a reader annotation style.

18. The system of claim 17, wherein the mark parser uses the frequency of occurrence information to determine the relative importance of a freeform annotation, with the freeform annotation having the highest frequency of occurrence being marked as the high-value freeform annotation.

19. The system of claim 17, wherein the mark parser ranks, types and groups the freeform annotations by:

clustering a plurality of the at least one freeform annotation into one level or multi-level hierarchical groups;

categorizing the clustered plurality of freeform annotations into freeform annotation types; and grouping the categorized and clustered plurality of freeform annotations with passages from the document data, wherein an overlap between a pair of the grouped passages produce a multi-mark cluster.

20. The system of claim 19, wherein a weighted value is assigned to each group.

21. The system of claim 14, wherein the freeform annotation altering circuit or routine changes at least one output characteristic of the freeform annotation according to the assigned weighted value of the typed, ranked and grouped freeform annotation.

22. The system of claim 21, wherein the at least one output characteristic includes changing at least the font color, font size or adding an icon.

23. The method of claim 1, wherein said at least one freeform annotation comprises a plurality of freeform annotations including at least two different types of freeform annotation.

24. The system of claim 1, wherein said at least one freeform annotation comprises a plurality of freeform annotations including at least two different types of freeform annotation.

* * * * *